C. L. DUNHAM.
NUT LOCK.
APPLICATION FILED JUNE 16, 1910.
990,122.
Patented Apr. 18, 1911.
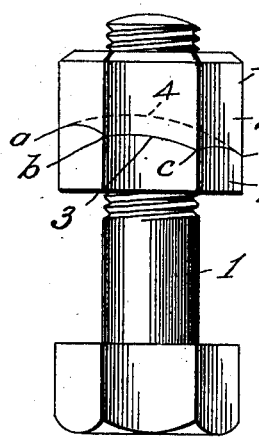
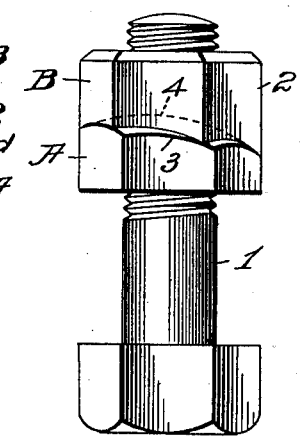
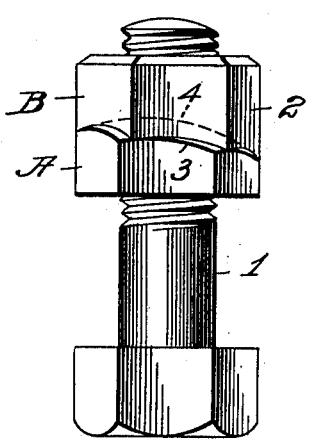
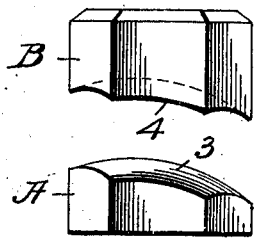
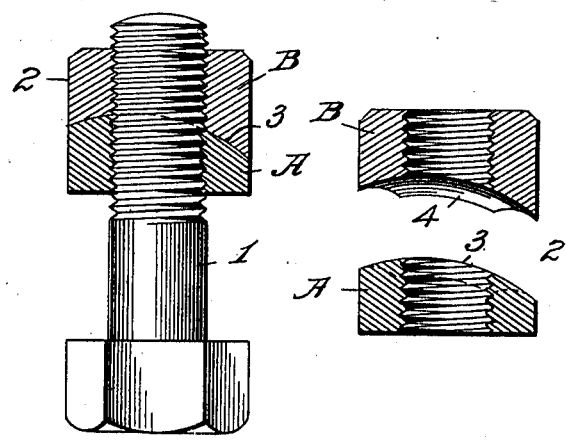
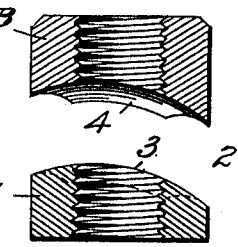
Witnesses
Inventor
Charles L. Dunham
By John P. Duffie
His Attorney

UNITED STATES PATENT OFFICE.

CHARLES L. DUNHAM, OF STEUBENVILLE, OHIO.

NUT-LOCK.

990,122. Specification of Letters Patent. Patented Apr. 18, 1911.

Application filed June 16, 1910. Serial No. 567,234.

*To all whom it may concern:*

Be it known that I, CHARLES L. DUNHAM, a citizen of the United States, residing at Steubenville, in the State of Ohio, have invented certain new and useful Improvements in Nut-Locks, of which the following is a specification.

This invention relates to new and useful improvements in nut locks, and is especially designed as an improvement on the construction shown in my pending application for a nut lock, filed Mar. 31/10, Ser. No. 552,594.

The principal objects of the present invention are to provide a greater gripping action between the meeting or engaging rection. Fig. 4 is a detail elevation of the nut and to provide a nut lock that may be effectively locked by turning the outer section in either direction.

With the foregoing and other objects in view that will readily appear as the nature of the invention is better understood, the same consists in the novel features of construction, combination and arrangement of parts illustrated in the drawings and more particularly specified in the appended claims.

In the accompanying drawings, in which like parts are designated by like reference characters through the several views:—Figure 1 is a side elevation of a bolt with the nut thereon, showing how the two sections of the nut are matched together in screwing the same on or off the bolt. Fig. 2 is a similar view, showing how the nut may be locked on the bolt by turning the outer section of the nut inwardly. Fig. 3 is a view similar to Fig. 2, showing how the nut may be locked on the bolt by turning the outer section thereof outwardly or in an opposite direction. Fig. 4 is a detail elevation of the nut with the parts shown in juxtaposition. Fig. 5 is a central longitudinal section of Fig. 1, and Fig. 6 is a view similar to Fig. 4 with the nut shown in section.

Referring to the drawings for a more particular description of the invention and which are for illustrative purposes only and are therefore not drawn to scale, the numeral 1 indicates the bolt and 2 the nut as a whole, which as shown, consists of the inner and outer sections A and B.

In carrying out the invention, the meeting or engaging faces of the two sections of the nut are formed at an angle with the ends of the nut or with an imaginary plane taken through the nut at right angles with the bore or opening thereof. Furthermore, the outer face 3 of the inner section A is made convex and the inner face 4 of the outer section B is made concave to correspond with the convexity of the inner section. The purpose of this construction will be presently disclosed.

To screw the nut on or off of the bolt, the two halves or sections thereof are arranged with the corners $a$, $b$, $c$, $d$, etc., matched together when the nut may be screwed on or off the bolt as a unit. After the nut has been screwed on the bolt to the proper position the outer section B is turned slightly relatively with the inner section as a result of which the nut is securely locked against turning or working loose on the bolt. By making the meeting faces of the two sections of the nut concave and convex, the nut may be effectively locked on the bolt by turning the outer section either to the right, as indicated in Fig. 2 of the drawings, or to the left, as indicated in Fig. 3.

From the foregoing description taken in connection with the drawings, it is thought that the construction and operation of the invention will be readily understood without requiring a more extended explanation.

Various changes in the form, proportions and minor details of construction may be resorted to without departing from the principles or sacrificing any of the advantages of this invention as defined in the appended claims.

Having described my invention, what I claim as new and desire to secure by Letters Patent, is:—

1. A nut lock formed by making the nut in two sections having respectively, concave and convex meeting or engaging faces disposed at an angle with the ends of the nut.

2. A nut lock formed by making the nut in two sections having their meeting or engaging faces disposed at an angle with a general plane taken through the nut at right angles with the bore or opening thereof, said meeting faces being, respectively, concave and convex whereby the nut may be secured
5 in locked position by turning the outer section in either direction with relation to the inner section.

In testimony whereof I affix my signature in presence of two witnesses.

CHARLES L. DUNHAM.

Witnesses:
J. O. BLACKBURN,
LOUISE WOLTJEN.

Copies of this patent may be obtained for five cents each, by addressing the "Commissioner of Patents, Washington, D. C."